Patented Oct. 16, 1934

1,977,251

UNITED STATES PATENT OFFICE 1,977,251

EPICHLORHYDRIN AND AMMONIA CONDENSATION PRODUCT

Otto Stallmann, South Milwaukee, Wis., assignor to E. I. du Pont de Nemours & Company, Wilmington, Del., a corporation of Delaware No Drawing. Application May 12, 1933, Serial No. 670,746

11 Claims. (Cl. 260—127)

This invention relates to novel compositions of matter. It is an object of this invention to produce new organic compounds or compositions of matter which are useful in the dyeing and printing arts. Other and further important objects of this invention will appear as the description proceeds.

I have found that when epichlorhydrin and ammonia are reacted together in a dilute reaction zone, novel compounds are produced which possess valuable qualities as assistants in printing with vat dyestuffs. The chemical nature of the novel reaction products is not clearly understood. Very likely they are mixtures of several related compounds, among which a secondary amine of the probable formula

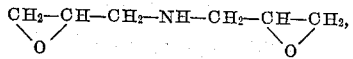

is, to the best of our knowledge, present as such or in a polymerized form. Some of these compounds are undoubtedly present also in the product obtained by reacting dichlorhydrin and ammonia in a highly dilute reaction zone and treating the product with caustic alkali. (See copending application of Gubelmann, Ser. No. 556,937.) The proportions of the various ingredients, however, appear to be different, as is evident by their different effects when used as printing assistants for vat dyestuffs. My novel compounds or compositions of matter appear also to be different from the reaction products, obtained by reacting epichlorhydrin and ammonia in a more concentrated zone, as disclosed for instance by Darmstaedter, Annalen, vol. 148, pages 124–125. The latter reaction products appear to contain organic-bound chlorine, while my novel compounds appear to be free of chlorine except for that which is attached to the nitrogen atom in case the reaction product is isolated as hydrochloride.

My novel reaction products are highly hygroscopic, syrup-like masses, which solidify to rosin-like products when cold and completely dry. They are readily soluble in water and alcohol in all proportions. Their aqueous solution is strongly basic, almost as strongly as dilute caustic soda solution (pH=about 12). They form readily neutral salts with various inorganic and organic acids such as hydrochloric, sulfuric and phosphoric acid or sulfonic acids of the benzene, naphthalene or anthracene series. The hydrochlorides resemble in physical properties the free bases, and like the latter are highly useful as assistants for printing pastes containing vat dyestuffs of the indanthrone series.

Without limiting my invention to any particular procedure, the following examples are given to illustrate my preferred mode of operation. Parts mentioned are by weight.

Example 1

92 parts of epichlorhydrin are dissolved in 736 parts of denatured technical ethyl alcohol and the solution is heated to 60–70° C. The mass is then kept agitating at 60–70° C. for a total of 20–30 hours, while a slow stream of dry ammonia gas is allowed to pass over the surface of the reaction mass. The ammonium chloride, which has precipitated out during this period is now filtered off and the filtrate is treated at 65–70° C. with a 10% alcoholic caustic soda solution until the mass is distinctly alkaline to thymol phthaleine paper. About one-half of the alcohol is now distilled off, together with any excess of ammonia, and cooled to room temperature and filtered from the precipitated sodium chloride. The filtrate is evaporated to dryness, the final stages being carried out under vacuum at about 100° C. The residue, which is practically pure assistant, is made up to a viscous liquid by the addition of water to about 20% of its weight, and can be stored in this condition indefinitely.

The constitution of the novel product is not known definitely, but it most probably consists of a compound having the formula

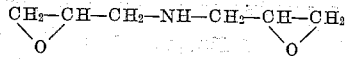

as such or in a polymerized form which may be called diepihydrin-amine.

Example 2

The procedure is carried out exactly as described in Example 1, except that absolute methyl alcohol is used as solvent instead of the technical denatured ethyl alcohol. The end product is identical with the product of Example 1.

Example 3

92 parts of epichlorhydrin are dissolved in 368 parts of absolute, denatured ethyl alcohol and the solution is heated to 50–55° C. There is then added at this temperature, under agitation, a solution of 41 parts of ammonia gas in 368 parts of absolute alcohol. This solution is dropped in slowly and uniformly within a period of 4–6 hours. The mass is then stirred for another 30–40 hours at 50–55° C. and the clear solution is poured off into another vessel, leaving behind about 26 parts of ammonium chloride. The clear solution is then treated with about 155 parts of a 22% sodium alcoholate solution to render the reaction mass distinctly and permanently alkaline to thymol phthaleine paper. About one-half of the alcohol and the excess ammonia is now distilled off from the mass, which is then cooled to room temperature and filtered. The filtrate is evaporated to dryness, in the final stages under vacuum at 100° C., and the residue is stirred up into a viscous liquid by the addition of 20% of its weight of hot water.

Example 4

92 parts of epichlorhydrin and 736 parts of denatured technical alcohol are treated with ammonia gas at 60–70° C. as described in Example 1. At the end of the 20–30 hours period there are then added, without filtering off the precipitated ammonium chloride, a total of about 400 parts of a 10% alcoholic caustic soda solution until the mass is distinctly and permanently alkaline to thymol phthaleine paper. About one-half of the alcohol and the excess ammonia are now distilled off, the residual mass is filtered and the filtrate evaporated to dryness, finally under vacuum at 100° C. The reaction product thus obtained is stirred up with 20% of its weight of water to a syrup-like liquid.

The products obtained according to the above four examples appear to be identically the same and contain in the average about 12–15% of organic bound nitrogen on the dry basis and are free of organic bound chlorine. When technical denatured ethyl alcohol of about 94% strength is used in the preparation, as for instance in Examples 1 and 4, the product usually contains a small amount (2–4%) of sodium chloride.

Example 5

92 parts of epichlorhydrin and 460 parts of technical, denatured ethyl alcohol are heated to 65° C. There are then added slowly over a period of 2 hours at 65° C. a solution of 17 parts of ammonia (100%) in 300 parts of alcohol.

The mass is kept stirring at 65° C. for 15 hours and there are then added at 65° C. about 400 parts of a 10% alcoholic caustic soda solution, until the mass is distinctly alkaline to thymol phthaleine paper. The mass is cooled to room temperature, filtered and the filtrate is evaporated to dryness, finally under vacuum at about 100° C.

Example 6

92 parts of epichlorhydrin and 736 parts of absolute denatured ethyl alcohol are heated to 60–65° C. There are added at this temperature under agitation over a period of 2–3 hours about 43 parts of sodamide ($NaNH_2$), until finally a permanent, distinct alkalinity test is obtained on thymol phthaleine paper. The mass is then heated to reflux for ½ hour, then cooled to room temperature and filtered. The filtrate is evaporated to dryness, finally at 100° C. under vacuum, and the residue is made up to a syrup-like liquid with about 20% of its weight of water. The product thus obtained has good printing assistant properties and appears to be substantially identical with the product of Examples 1 to 4.

In the preceding examples the printing assistant was isolated in the form of the free base. For use in certain printing pastes, however, it has been found to be more expedient to employ the hydrochloride or other salts. These may be prepared and isolated as illustrated in the following examples:

Example 7

The procedure is carried out exactly as in Example 3, including the drying of the reaction product under vacuum at 100° C. There are then stirred into the strongly alkaline, semisolid residue about 60 parts of hydrochloric acid (20° Bé.), until the mass is but very slightly alkaline to brilliant yellow paper. The clear solution, thus obtained, may then be evaporated under vacuum to any desired viscosity. For practical reasons it is best to carry the evaporation until a syrup-like liquid, consisting of about 75% non-volatile material and 25% water is obtained. Such a composition is most suitable for use in printing pastes, since it dissolves readily in the color paste, without causing coagulation and possesses the additional desirable property of lowering the viscosity of the printing paste.

Example 8

92 parts of epichlorhydrin and 736 parts of technical denatured ethyl alcohol are treated with ammonia gas as described in Example 1 for 24 hours at 65° C. The mass is then cooled to room temperature and filtered. The filtrate is evaporated to a total residue of about 150 grams, which is cooled to room temperature. The clear solution is then poured off from some insoluble, gummy material and evaporated at about 50–70° C. under vacuum to dryness. The residue is stirred up with hot water to a 75% syrup-like liquid, which appears to be identical with the end product obtained according to Example 7.

Example 9

92 parts of epichlorhydrin and 400 parts of water are heated to 65–70° C. There are then added at 65–70° C. slowly within a period of 1½–2 hours 40 parts of a 28% ammonia-water solution, keeping the mass under vigorous agitation. At the end of this period, the epichlorhydrin oil layer disappears and a clear solution is obtained, which is heated to 95° C. and kept at this temperature for 1 hour. It is then distilled in vacuo to dryness at a final temperature of about 100° C. The residue is stirred up with about 20% of its weight of water to a syrup-like solution, which appears to be identical with the product obtained according to Example 8, except that it contains some ammonium chloride in solution.

Example 10

The procedure is carried out as described in Example 7, except that in lieu of hydrochloric acid, about 49 parts of phosphoric acid are used or sufficient to neutralize the strongly alkaline base to a very slight alkalinity to brilliant yellow paper. The end product is the phosphate of the new assistant, which is generally similar in properties to the corresponding hydrochloride obtained in Example 7.

Example 11

The procedure is the same as described in Example 7, except that in lieu of hydrochloric acid, about 144 parts of the beta-anthraquinone-sulfonic acid are used for neutralization, producing the anthraquinone-beta-sulfonic acid salt of the new assistant.

Numerous variations are possible in the method of preparing the novel assistants, as will be readily understood by those skilled in the art.

Thus, in the amidation step the temperature may be lowered under 50° C., allowing a longer reaction time for completion of the reaction, or again a higher temperature, for instance, reflux temperature (75-80° C.) may be employed for a shorter time. It has been found, however, that higher temperatures at this stage of the reaction favor the formation of a gummy by-product which is insoluble in alcohol and water, and consequently lower the yield of usable assistant.

In the step of basing the hydrochlorides with a suitable alkali, the temperature at which this reaction is carried out may be chosen at will. 60-70° C. was preferred in the above examples because at this temperature the sodium chloride is formed in large crystals which will settle and can be filtered off readily. Aside from this point, however, any other temperature may be used. Other alkalies, such as potassium hydroxide or such potassium or sodium salts which act like caustic in alcoholic solution may be employed, as for instance sodamide ($NaNH_2$).

The amidation step may be combined with the caustic treatment in one reaction, as shown, for instance, in Example 6 above.

The amounts of alcohol or water used may be varied within wide limits, and other solvents such as methyl, propyl, or butyl alcohol may be used.

Instead of using pure, distilled epichlorhydrin, the crude, wet product obtained from crude dichlorhydrin and lime may be used successfully.

Many other variations and modifications are possible in my preferred procedure above set forth, without departing from the spirit of this invention.

I claim:

1. The reaction product of epichlorhydrin and ammonia producible by reacting the two compounds in a highly dilute form.

2. A gummy, hygroscopic, water soluble mass, being substantially identical with the product obtainable by circulating ammonia gas over an alcoholic solution of epichlorhydrin until the reaction product is substantially free of organic bound chlorine.

3. An epichlorhydrin-ammonia reaction product consisting predominantly of diepihydrin-amine or an addition salt thereof.

4. An addition salt of diepihydrin-amine.

5. The hydrochloride of diepihydrin-amine.

6. The process of producing a water-soluble reaction product of epichlorhydrin and ammonia, which comprises reacting these compounds in a highly dilute form.

7. The process of producing a water-soluble reaction product of epichlorhydrin and ammonia, which comprises circulating ammonia gas over an alcoholic solution of epichlorhydrin.

8. The process of producing a water-soluble reaction product of epichlorhydrin and ammonia, which comprises circulating ammonia gas over an alcoholic solution of epichlorhydrin, and continuing the reaction until the product is free of organic-bound chlorine.

9. The process of producing a water-soluble reaction product of epichlorhydrin and ammonia, which comprises circulating ammonia gas over an alcoholic solution of epichlorhydrin, until the product is free of organic-bound chlorine, neutralizing the dissolved reaction mass with alkali, and recovering the reaction product in the form of free base.

10. The process of producing a water-soluble reaction product of epichlorhydrin and ammonia, which comprises circulating ammonia gas over an alcoholic solution of epichlorhydrin until the product is free of organic-bound chlorine and recovering the reaction product in the form of its hydrochloride.

11. The process of producing a water-soluble reaction product of epichlorhydrin and ammonia, which comprises circulating ammonia gas over an alcoholic solution of epichlorhydrin, until the product is free of organic-bound chlorine, recovering the reaction product in the form of free base, and reacting the latter with an acid to produce the corresponding neutral addition salt.

OTTO STALLMANN.